(12) United States Patent
Tittel et al.

(10) Patent No.: US 7,853,007 B2
(45) Date of Patent: Dec. 14, 2010

(54) CONFERENCE TERMINAL WITH ECHO REDUCTION FOR A VOICE CONFERENCE SYSTEM

(75) Inventors: Martin Tittel, Forchheim (DE); Manfred Lutzky, Nuernberg (DE); Juergen Hupp, Nuernberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1007 days.

(21) Appl. No.: 11/622,318

(22) Filed: Jan. 11, 2007

(65) Prior Publication Data

US 2007/0189507 A1   Aug. 16, 2007

Related U.S. Application Data

(63) Continuation of application No. PCT/EP2005/007498, filed on Jul. 11, 2005.

(30) Foreign Application Priority Data

Jul. 13, 2004   (DE) .................... 10 2004 033 866

(51) Int. Cl.
  *H04M 9/00* (2006.01)
(52) U.S. Cl. ................... 379/406.04; 709/204; 455/518
(58) Field of Classification Search ................ 455/518, 455/519; 709/204; 379/406.04
  See application file for complete search history.

(56) References Cited

U.S. PATENT DOCUMENTS

| | | | |
|---|---|---|---|
| 5,062,102 A | 10/1991 | Taguchi | |
| 5,404,397 A | 4/1995 | Janse et al. | |
| 5,600,714 A | 2/1997 | Eppler, Jr. et al. | |
| 6,215,880 B1 | 4/2001 | Hasegawa | |
| 6,404,886 B1 | 6/2002 | Yoshida et al. | |
| 6,408,327 B1 | 6/2002 | McClennon et al. | |
| 2004/0116130 A1 | 6/2004 | Seligmann | |

FOREIGN PATENT DOCUMENTS

| | | |
|---|---|---|
| EP | 0191492 | 8/1986 |
| JP | 10136100 | 5/1998 |
| WO | WO9604744 | 2/1996 |

OTHER PUBLICATIONS

"Canadian Office Action mailed May 14, 2009," (2 pgs.).

*Primary Examiner*—Creighton Smith
(74) *Attorney, Agent, or Firm*—Dicke, Billig & Czaja, PLLC (57) ABSTRACT

A conference terminal for a digital voice conference system comprises a first sound transducer means, which is implemented to generate a microphone signal from an acoustic signal, a second sound transducer means, which is implemented to generate an acoustic signal from a loudspeaker signal, a connecting means, which is implemented to enable a connection between conference terminal and a conference central unit, to receive a composite conference signal from the conference central unit, and a means for echo suppression, which is implemented to combine the microphone signal or a signal derived therefrom in a noise suppression means with a composite conference signal in a listening operation of the conference terminal, such that a loudspeaker signal results, in which the acoustic signal, on which the microphone signal is based, is reduced. Such a conference terminal allows the suppression of a remote own echo and a remote foreign echo, whereby digital wireless voice conference systems can be realized, which ensure high voice quality and noise immunity with minimum wiring effort.

18 Claims, 5 Drawing Sheets

CONFERENCE TERMINAL WITH ECHO REDUCTION FOR A VOICE CONFERENCE SYSTEM

CROSS-REFERENCE TO RELATED APPLICATION

This application is a continuation of copending International Application No. PCT/EP2005/007498, filed Jul. 11, 2005, which designated the United States and was not published in English.

BACKGROUND OF THE INVENTION

1. Field of the Invention

The present invention relates generally to a conference terminal for a voice conference system, particularly to a conference terminal with echo reduction for a digital voice conference system.

2. Description of the Related Art

Voice conference systems are used anywhere where communication within a group of persons is not possible in a direct way due to too large distances, too high noise level or due to other reasons. Here, it has to be differentiated between systems where the communicating persons are very far apart from each other, so that direct acoustic coupling between the persons is not given, and they can only hear the other conference participants via the voice conference system, and such configurations, where the persons participating in the conference can hear persons both in a direct acoustic way and via the voice conference system due to very close proximity.

The first type of voice conference system corresponds to a teleconference according to the prior art. In a teleconference, delay times occur on the transmission path, which can cause spurious echoes. However, no uniform conference signal exists in these systems, but every participant obtains a specific conference signal, which does not include his own signal. Additionally, there is no direct acoustic coupling of two participants, since they are at totally different locations.

The second type of voice conference system, where persons can hear other conference participants both in a direct acoustic way and via the voice conference system, are, for example, used in meeting rooms, auditoriums, congress halls or others. Here, a plurality of participants is to have the opportunity to provide a voice contribution, and all participants are to hear the voice contributions of the other participants. Here, the contribution to the discussion of an individual participant is not audible in a direct acoustic way in the whole room, but can be heard in a direct way by a person close to the speaker.

A differentiation is also to be made between voice conference systems with wire transmission and systems where the transmission of the voice signal is wireless. Wire systems according to the prior art have the advantage that the transmission capacity of a wire transmission path is very high. In such systems, the audio signals can be transmitted analogously when using high quality cable. However, it is more advantageous to use an uncompressed digital audio signal transmission. The propagation times of the audio signals on such a cable are so short in a spatially limited conference that no audible remote echoes occur. Merely a local echo is compensated to avoid feedback noise in a terminal.

However, nowadays, there is the trend to design voice conference systems for meeting rooms, auditoriums, conference halls or the same in a wireless way. This increases the flexibility in configuring a system and reduces the installation costs significantly, since no further wiring is required apart from a power supply. Otherwise, wireless implementation of a voice conference system allows the realization of a voice conference even when the participating persons are not tied to one location and move, for example, around the room. However, it has to be noted that the technical requirements are significantly higher in a radio based voice conference system than in a wire system.

According to the prior art, mostly analog systems or digital systems without compression are used. The signal propagation time during the transmission of an acoustic signal via such a system is typically low. Particularly, there is only a low delay between the voice signal of a speaking participant and the composite conference signal provided by the voice conference system via a uniform return channel, which contains the contribution of the speaking participant and is output at the loudspeaker of the speaking participant. Due to the low delay, the own voice signal transmitted back to the speaker is not perceived as spurious echo.

However, the radio resources available for a radio-based voice conference system are very limited. In many cases, this requires the digital transmission of the voice signal encoding the same prior to transmission for reducing the data amount and for protection from transmission errors. If the voice conference system uses digital radio transmission and digital audio encoding, a delay of the signal in the two-digit millisecond range results on the transmission path. Further, in contrast to conventional teleconference systems, due to the limited radio resources, it is not possible in wireless voice conference systems that every participant receives a specific conference signal, which does not include his own signal, from the central unit via an exclusive return channel. Rather, in many cases, a uniform conference signal, which is broadcast like a broadcast signal, is provided to all participants. Thus, the uniform conference signal has a significant time delay in a two-digit millisecond range compared to the voice signal of a speaker. It is the consequence of this delay that the speaker perceives a clearly spurious echo of his own comments. This limits currently the applicability of a digital signal transmission in connection with encoding for voice conference systems with delays.

However, currently, there is the tendency to implement voice conference systems with digital wireless transmission.

For a better understanding of the occurring problems, the mode of operation of a voice conference system will now be discussed in more detail. All persons are to be able to participate in the conference via terminals connected in a wireless way. There, all participants can hear the composite signal of all other speaking participants at: all times, via a loudspeaker incorporated in their terminal. The composite signal is formed in a central unit and is constantly transmitted to all terminals. When operating a talk key, the talk signal of the microphone of a participant is transmitted from a terminal to the central unit and there fed into the composite signal.

In such a system, different types of echoes are produced. A local echo (feedback) occurs by acoustic and/or electromagnetic coupling from the loudspeaker to the microphone of a terminal. Such an echo can be reduced with known methods for echo compensation.

Particular problems occur when the propagation time of a transmitted voice signal from one terminal to another terminal is more than about 20 milliseconds. This is particularly the case in digital voice conference systems where a voice signal is transmitted via a transmission channel in an encoded way. During encoding, large delays in a two-digit millisecond range occur. This causes distinct echoes.

Figure 4:
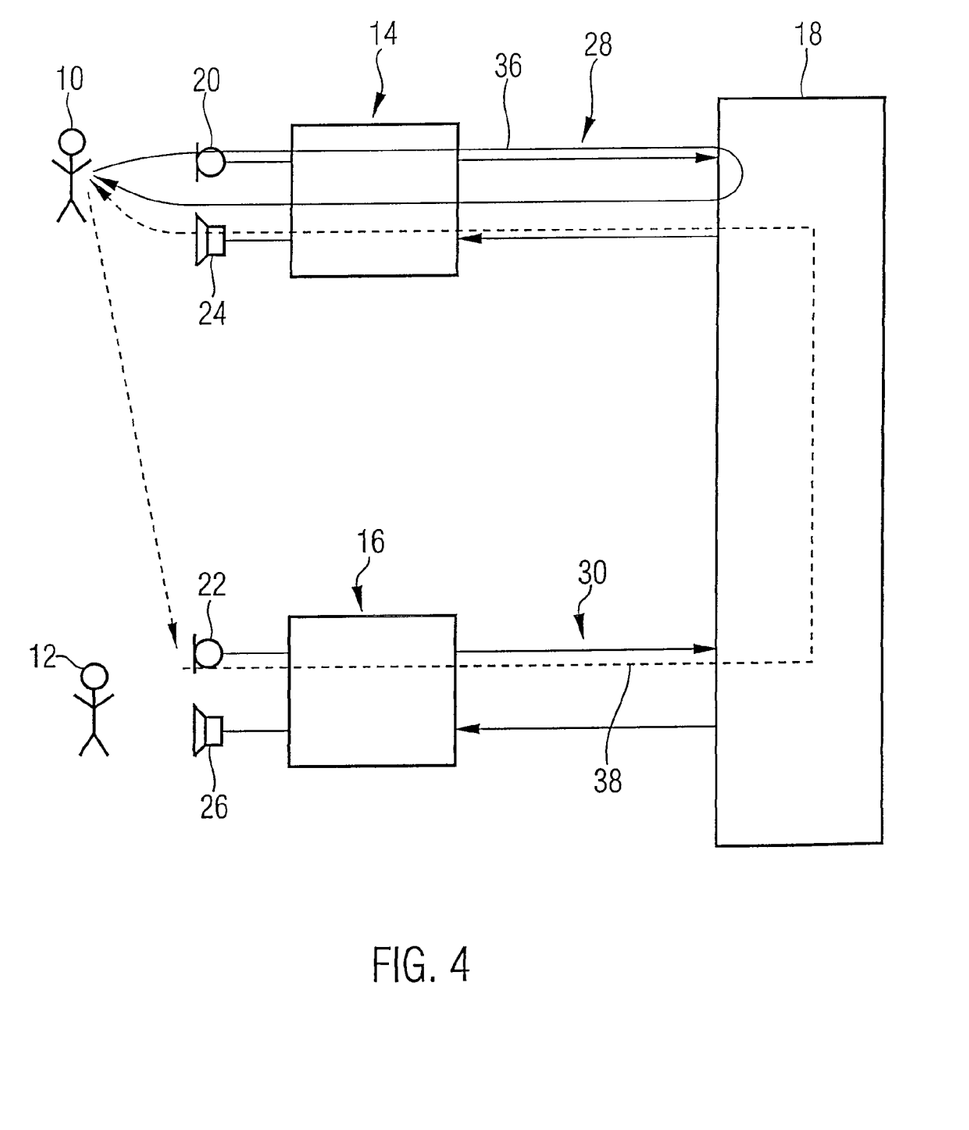
FIG. 4 is a portion of a block diagram of a voice conference system according to the prior art with marked audio signals, which cause an own echo.

The formation of echoes will be discussed below in more detail with reference to FIG. 4 and FIG. 5. FIG. 4 shows a portion of a block diagram of a conventional voice conference system. A first conference participant 10, a second conference participant 12 as well as two associated conference terminals 14 or 16, respectively, are shown. Further, the voice conference system comprises a conference central unit 18. The two conference terminals 14 or 16, respectively, each comprise a microphone 20, 22 as well as a loudspeaker 24, 26. The first conference terminal 14 of the first conference participant 10 as well as the second conference terminal 16 of the second participant 12 are connected to the conference central unit 18 via a bidirectional connection 28 or 30, respectively.

Starting from the structure of a voice conference system, the formation of echoes will be discussed in more detail below. Local echoes, i.e. the feedback from a loudspeaker 24, 26 to a microphone 20, 22 of the same terminal will not be described here, since they can easily be suppressed or reduced, respectively, with known technical measures. Here, first, the echo is considered which a first conference participant 10, who is speaking himself, perceives. Here, it has to be considered that the first conference participant 10 perceives the acoustic voice signal generated by himself directly with his ears. Further, the acoustic signal generated by the speaker follows a signal path designated by 36. The voice signal of the first conference participant is received by the microphone 20 of the first conference terminal 14. Then, the first conference terminal 14 provides the same to the conference central unit 18. There, it is incorporated into the conference composite signal. By digital radio transmission and particularly digital signal processing and encoding and decoding of the digitally transmitted voice signal, a significant delay of the signal in the two-digit millisecond range results on the transmission paths. The voice signal of the first conference participant is then transmitted again from the conference central unit 18 to the first conference terminal 14. There, it is output on the loudspeaker 24 and perceived by the first conference participant 10. Thus, the first conference participant 10 does not only perceive his own acoustic voice signal, but also a echo signal transmitted via the voice conference system, which is heavily delayed in time. Thus, if a signal is transmitted back to its source after conference formation as part of the conference signal, an audible echo perceived as spurious is formed, which is referred to as remote own echo.

Further, it is also possible that the conference terminal 16 of a second conference participant 12 is in talk operation, while a first conference participant 10 is speaking. In this case, a further signal path 38 exists, which causes an echo. The voice signal of the first conference participant 10 is received at the second conference terminal 16 of a second conference participant 12 via the microphone 22 and transmitted to a conference central unit 18 with time delay. There, it is incorporated in a conference composite signal. As part of the conference composite signal, it is then supplied to the first conference terminal 14 of the first conference participant 10 and output at a loudspeaker 24. Thus, the first conference participant 10 perceives a delayed echo of his own voice signal. This effect is also referred to as remote own echo.

A further remote own echo by the simultaneous talk operation of another terminal is avoided by the local echo reduction in the other terminal.

Figure 5:
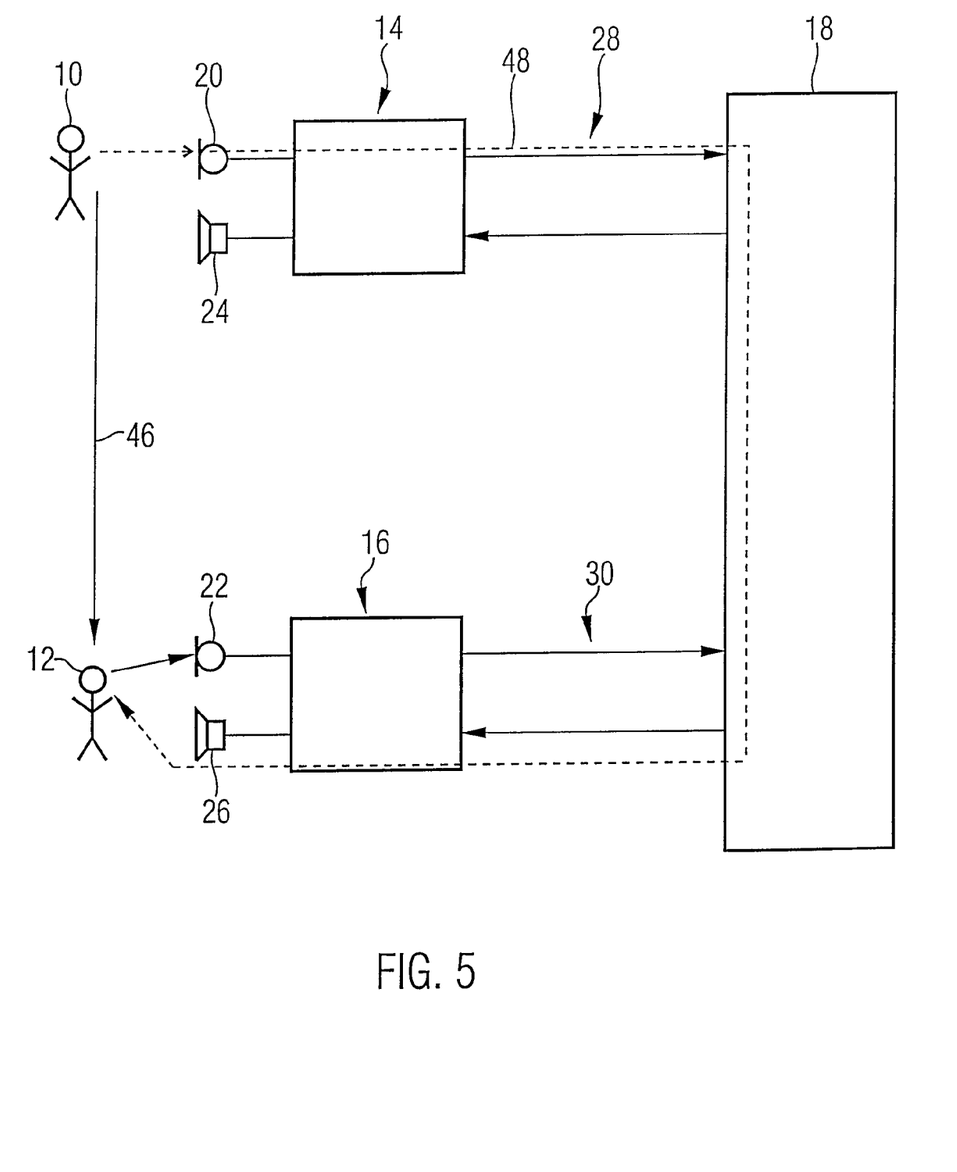
FIG. 5 is a portion of a block diagram of a voice conference system according to the prior art with marked audio signals, which cause a foreign echo.

FIG. 5 shows a further portion of a block diagram of a conventional voice conference system. The structure of the voice conference system is identical to the one described with regard to FIG. 4 and will not be described again here. Particularly, the same reference numbers indicate the same means. Here, the interest lies on the examination of signal paths from a first participant 10, here acting as speaker, to a second conference participant 12, here acting as listener. If the first conference participant and the second conference participant 12 are near enough to each other, the second conference participant 12 can hear the voice contribution of the first conference participant 10 on the direct acoustic way 46. Further, a second signal path exists for the voice signal of the first conference participant 10 to the second conference participant 12, here indicated by 48. Here, the voice signal of the first conference participant is transmitted to the conference central unit 18 via the conference terminal 14 of the first conference participant, and from there passed on to the second conference terminal 16 of the second conference participant 12. Thereby, in the case of digital encoded audio signal transmission, a significant delay in the two-digit millisecond range results. Correspondingly, the voice signal received by the voice conference system from the second conference participant via the signal path 48 has a significant delay compared to the voice signal received on the direct acoustic path 46. If the second conference participant hears the voice contribution of another participant both on the direct acoustic path and with time delay via the voice conference system, this is also perceived as spurious echo. This is referred to as remote foreign echo.

Further, it has to be noted that the different types of echoes need to be counteracted with different degrees of difficulty. As has already been mentioned, it is easily possible to reduce a local echo.

A remote own echo, which results due to the fact that the own conference terminal receives his own voice signal, passes the same on to the central unit and receives it again from there, cannot be easily suppressed. Thus, in conventional systems, this is only no problem because they use analog or unencoded digital transmission, where hardly noticeable signal delays occur. However, a digital encoded voice signal transmission, where delays occur inevitably, is made more difficult or even impossible by the echo. Such an echo results on the signal path 36 shown in FIG. 4. The propagation time on the signal path 36 is known with sufficient accuracy, since here mainly the known delay times of the encoding and decoding means are introduced. The suppression of an echo is more problematic when the propagation time of the signal or the difference of the propagation times, respectively, on two different transmission paths is not known. This is for example the case in the suppression of a remote foreign echo. The delay time on the direct acoustic path 46 is not known, while the delay on the signal path 48 can be well estimated by the voice conference system. Thus, the propagation time difference between the direct acoustic path 46 and the signal path 48 through the voice conference system is not known. In this case, echo suppression is very difficult to accomplish and is thus not performed in voice conference systems according to the prior art. The same applies for a remote own echo, which occurs due to the fact that the own voice signal is received by the microphone of the conference terminal of a neighboring conference participant in talk operation, and is distributed in the voice conference system.

Rather, in voice conference systems of the prior art, the conference participants are asked to speak quietly to reduce a remote foreign echo. Thus, every conference participant is to speak so quietly that a neighboring participant can only hardly perceive him on the direct acoustic path, and communication even between neighboring participants takes place substantially via the voice conference system. However, such a measure is not satisfying, since it does not correspond to the natural way of expression of the speakers. Thus, it is very awkward for the speaker to use a conventional voice conference system, particularly when neighboring conference participants are very close to each other.

SUMMARY OF THE INVENTION

It is an object of the present invention to provide a conference terminal with improved echo reduction.

The present invention provides a conference terminal for a digital voice conference system, having a first sound transducer means, which is implemented to generate a microphone signal from an acoustic signal, a second sound transducer means, which is implemented to generate an acoustic signal from a loudspeaker signal, a connecting means, which is implemented to enable a connection between the conference terminal and a conference central unit for receiving a composite conference signal from the conference central unit, and a means for echo suppression, which is implemented to combine the microphone signal or a signal derived therefrom with the composite conference signal, in an listening operation of the conference terminal, such that a loudspeaker signal results, in which the acoustic signal, on which the microphone signal is based, is reduced, or to combine the microphone signal or a signal derived therefrom with the composite conference signal, in a talk operation wherein the microphone signal is transmitted to the conference central unit, such that a loudspeaker signal results, in which the acoustic signal, on which the microphone signal is based, is reduced; and a threshold means, which is implemented to deactivate the means for echo suppression when the microphone signal is smaller than a predetermined threshold.

It is the central idea of the present invention that it is advantageous when a means for echo suppression is active in a conference terminal of a digital voice conference system when the conference terminal is in a listening operation or a talk operation. A remote foreign echo, which would be spurious in a listening operation of a conference terminal for the listening conference participant, can be reduced by a means for echo suppression, when those signal portions perceivable at the location of the listening conference participant via the free acoustic transmission path, are removed from the composite conference signal and are thus not reproduced by the loudspeaker of the conference terminal. In a similar way, an own remote echo can be suppressed, which results when the own voice signal is received by the conference terminal of a neighboring conference participant and fed into the voice conference system.

In a digital voice conference system, echo suppression has to be performed during talk operation due to the significant propagation times in the two-digit millisecond range and due to the usage of a uniform return channel, via which the own voice signal is supplied again to the terminal of a speaking participant with time delay, also.

For that purpose no appropriate apparatuses are known in the prior art. Thus, according to the prior art, it is not or only with significant limitations possible to operate digital voice conference systems in a resource efficient way. A significant advantage of an inventive conference terminal is that the requirements for the delay times in a voice conference system can be significantly softened by the introduction of echo suppression. This allows the usage of audio encoding and digital radio transmission or eases the same.

The human listener perceives an echo sensed as spurious when the human ear receives an audio signal twice with a time delay. Particularly in digital voice conference systems, the propagation times are so long that echoes are perceived as significantly spurious by a user. The delay time is equal to the propagation time, which an audio signal requires to be transmitted from a conference terminal to the conference central unit and back to the conference terminal, including possible delays by encoding and decoding.

During listening operation, a conventional means for echo suppression is inactive, since in that case the precisely predictable and, with regard to level, very strong own remote echo is not present. Thus, in contrary to conventional conference terminals, an inventive conference terminal allows a suppression of a possibly present remote foreign echo.

In an inventive conference terminal, means for noise suppression is also active during listening operation. In that case, the microphone signal is used for echo suppression. Here, the microphone signal describes very clearly the audio signal, which a human listener receives. A signal processing means removes now all those portions from the conference composite signal, which are included in the microphone signal, and which are thus also perceived by a human listener. Thus, it is ensured that the listener hears every audio signal only exactly once, i.e. either via the free air path or via the voice conference system.

An inventive conference terminal offers that the advantage that remote foreign echoes are effectively suppressed, which particularly cause significant adverse effects in delayed digital wireless conference systems with encoded transmission. The same advantage results for a remote foreign echo. Thus, it is possible to use such digital voice conference systems, without having to ask the conference participants to speak as quietly as possible in order to keep echoes low. This increases the comfort in usage of a voice conference system drastically. Further, when an inventive conference terminal is used, the requirement to maintain a minimum distance between neighboring speakers is omitted. Thus, according to the invention, digital wireless voice conference systems can be realized, which ensure high voice quality and interference immunity with minimum wiring effort and low need of radio resources.

In a preferred embodiment, the conference terminal includes an encoding means, which is implemented to encode the microphone signal. This has the advantage that a reduction of the data amount to be digitally transmitted is performed. Further, by encoding, the susceptibility against interferences on the transmission channel can be reduced. This is particularly advantageous when a digital wireless connection exists between the conference terminal and the conference central unit. In a similar way, preferably, the conference terminal includes a decoding means, which is implemented to decode a wireless transmitted digital conference composite signal. This feature is again helpful in connection with wireless digital transmission, since the required frequency resources are reduced by encoding and the susceptibility against interferences can be improved. Here, encoding can comprise both source encoding and channel encoding. Source encoding is suitable to reduce the data rate required for transmitting a voice signal. Source encoding assumes a voice signal, which is present in the form of a data current of time and value discrete sample values (pulse code modulation, PCM). Therefrom, a bit stream with lower data rate is generated with the help of an encoding means, which can be transmitted with low resource requirements on a wireless radio channel and can be stored in a terminal. Examples for an encoding means are an encoder according to the MP3 standard as well as encoders known from the mobile radio standards (e.g. RPE-LPE codec). However, generally, any encoder suitable for voice transmission can be used. On the receiver side, an associated decoder has to be used in any case. Apart from source encoding, suitable channel encoding is of great importance, particularly in wireless transmission. Source-encoded signals are susceptible for bit errors that can occur during transmission, due to the low redundancy contained therein. Thus, it is practical to use forward error correction. The same increases the data rate but at the same time improves the quality of the transmitted voice signals.

In a further preferred embodiment, the means for echo suppression includes a delay means, which is implemented to delay the microphone signal or a signal derived from the microphone signal by a delay time. It is particularly advantageous when the delay means is implemented such that the delay time can be adjusted. Such an embodiment allows the compensation of an unknown propagation time difference between the acoustic signals on the free acoustic path and through the voice conference system. The propagation time through the voice conference system is substantially constant, but the propagation time on the free acoustic path depends heavily on the spatial distance between speaking and listening conference participants.

The adjustment of the delay time is preferably performed in dependence on the microphone signal and the conference composite signal. By an appropriate means, the propagation time difference between the signals received via the conference composite signal and the free acoustic path can be determined. Such an arrangement offers the huge advantage that manual adjustment of the delay time is not required. Further, it is possible to use echo suppression even when the distance between the conference participants changes over time, e.g. because they move around the room. During talk operation, fixed adjustment of the delay time is possible. The same is calculated from the signal propagation time, i.e. from the sum of the time required to encode the voice signal, to transmit the same from the conference terminal to the conference central unit, to decode the same there, to add the same to the conference composite signal as well as to encode, to transmit and to decode the conference composite signal again. Additional delay times occur in the local echo suppression of the conference terminal as well as in further components in the signal path.

The means for noise suppression can be implemented in many ways. Simple implementations are preferred, such as an arrangement for difference formation between the delayed microphone signal and the conference composite signal. The same can be performed both in the time domain and in the spectral domain. A Wiener filter, which is regularly adapted to the echo signal to be suppressed, can effect suppression of the echo.

Further, it is advantageous when a means for echo suppression comprises a means for scaling. The same is implemented to scale the microphone signal, the conference composite signal or the loudspeaker signal. Thereby, volume variations in the echo signals can be balanced out. Thus, echo suppression is independent of the volume of the sound waves incident on the conference terminal. In such an embodiment, echo suppression works both for loud and soft acoustic signals incident on the direct acoustic path.

In a further preferred embodiment, the conference terminal includes a switching means, which is implemented to allow switching between a listening operation and a talk operation wherein the microphone signal is transmitted to the central unit. It is advantageous when a means for echo suppression in the listening operation can be adjusted such that a remote foreign echo is optimally suppressed, and can be adjusted in the talk operation such that an own remote echo is optimally suppressed. Thereby, for every operating case, a best possible voice quality can be obtained, without significantly increasing the effort for the means for voice suppression. For suppressing an own remote echo, merely other parameters have to be adjusted, but the structure of the means for echo suppression can remain unaltered.

In a further embodiment, the conference terminal can comprise a threshold means, which is implemented to deactivate the means for noise suppression, when the microphone signal is less than a predetermined threshold. Such a means has the advantage that no noise suppression takes place when the microphone signal is very weak. Thereby, speakers that can only be hardly heard in an acoustic way at the location of the listener, can be reproduced via the voice conference system. If the acoustic signal received on direct acoustic path is only weak, a listener does not perceive this as spurious. In such a case, the reproduction via the voice conference system is sufficient.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
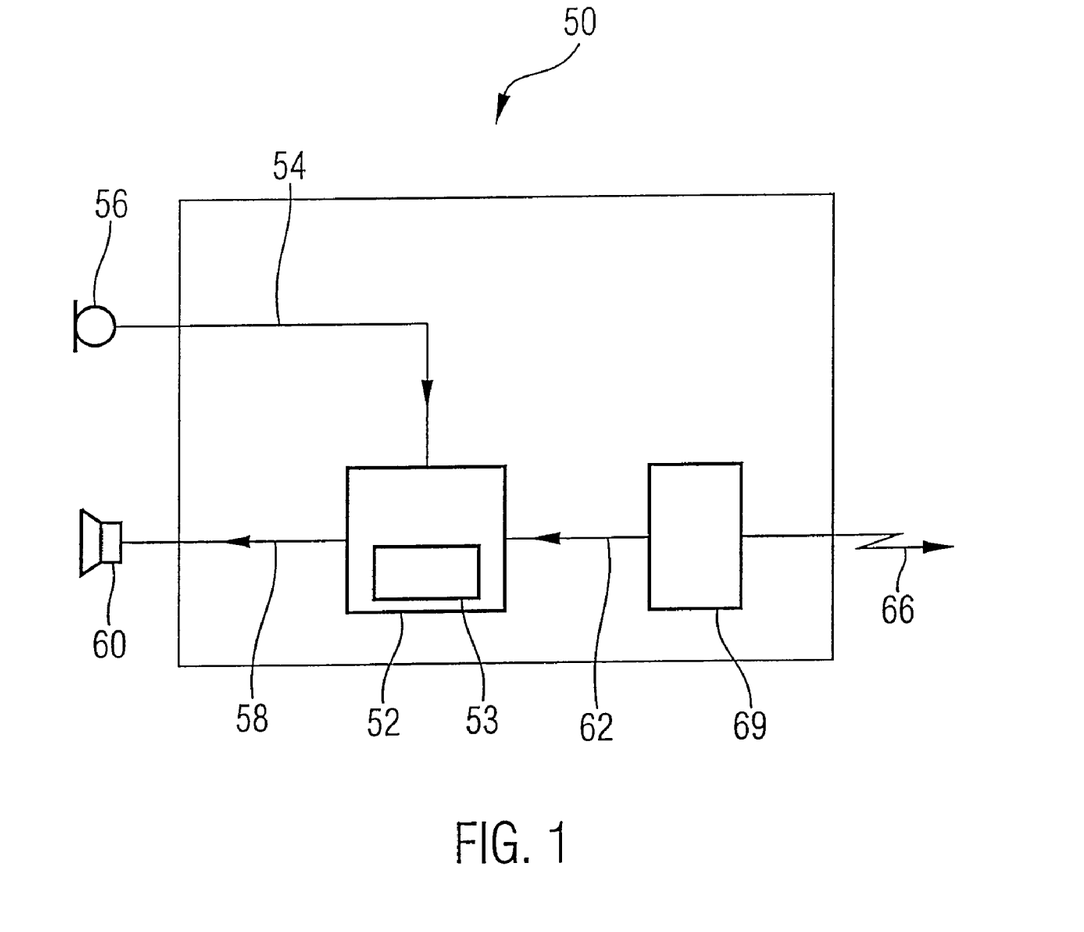
FIG. 1 is a block diagram of an inventive conference terminal according to an embodiment of the present invention.

FIG. 1 shows a block diagram of an inventive conference terminal according to an embodiment of the present invention. The conference terminal is designated by 50 in its entirety. Core of the conference terminal 50 is a means 52 for echo suppression, which comprises a means 53 for noise suppression. The means 52 for echo suppression receives a microphone signal 54 from a first sound transducer means 56 and provides a loudspeaker signal 58 to a second sound transducer means 60. Further, a composite conference signal 62 is supplied to the means 52 for echo suppression, which a connecting means 64 receives from a central unit. The transmission path between the central unit and the connecting means 64 is here designated by 66.

The first sound transducer means 56, which is preferably implemented as microphone, generates a microphone signal 54 from an incident acoustic signal. The second sound transducer means 60, which is preferably implemented as loudspeaker, generates an acoustic signal from a loudspeaker signal 58. The means 52 for echo suppression has the task to combine the microphone signal 54 with the conference composite signal 62, such that an acoustic signal, on which the microphone signal is based, is reduced in the loudspeaker signal 58. Thereby, a means 53 for noise suppression included in the means 52 for echo suppression is used.

Figure 2:
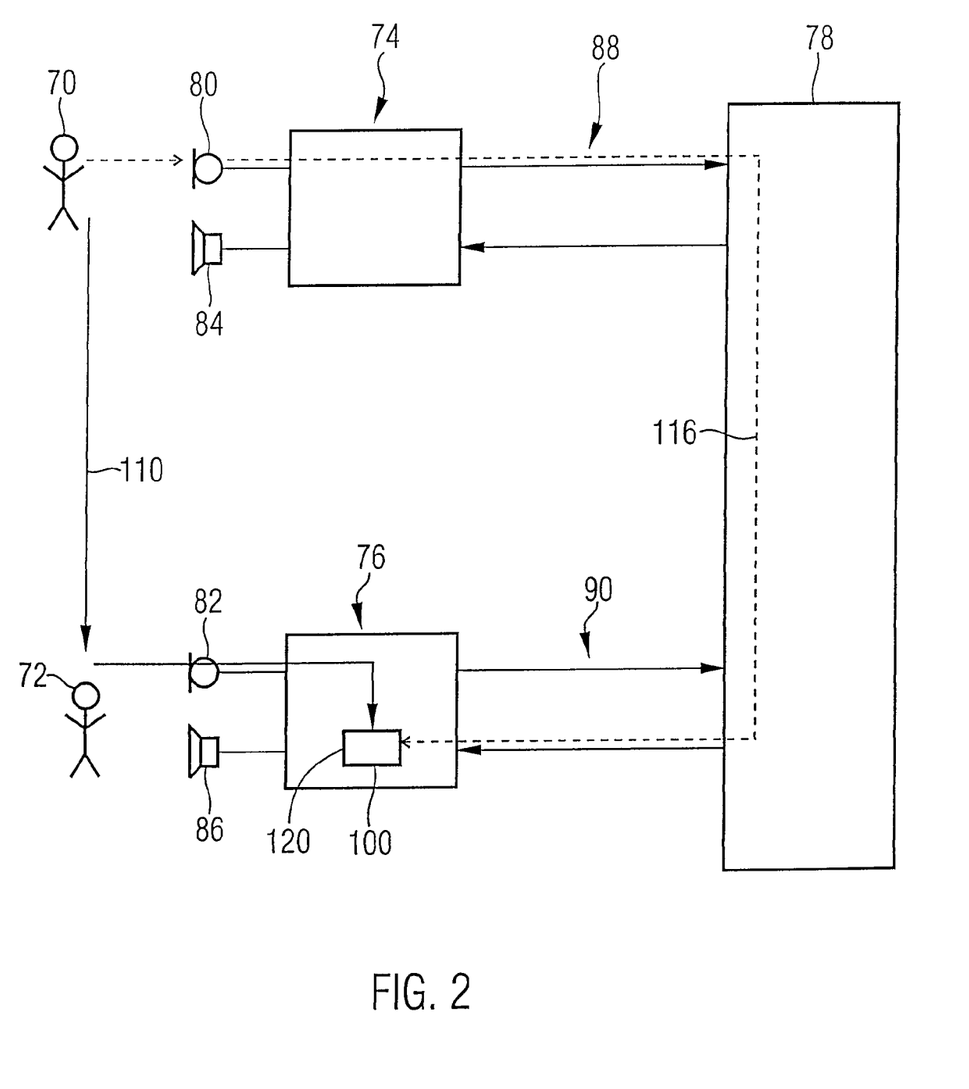
FIG. 2 is a portion of a block diagram of a voice conference system with an inventive conference terminal with marked audio signals.

FIG. 2 shows a portion of a block diagram of a voice conference system, which has an inventive conference terminal. Further, the relevant acoustic signals are marked in the block diagram. The voice conference system is used by two conference participants 70, 72, wherein the first conference participant 70 acts as speaker and the second conference participant 72 acts as listener. The voice conference system comprises a first conference terminal 74 as well as a second conference terminal 76. Further, a conference central unit 78 is part of the voice conference system. Every conference terminal 74, 76 comprises one microphone 80, 82 each as well as one loudspeaker 84, 86 each. The first conference terminal 74 is connected to the conference central unit 78 via a first connection 88, and the second conference terminal 76 is connected to the conference central unit 78 via a second connection 90. Further, the second conference terminal comprises a means 100 for echo suppression.

Based on the structure of the voice conference system, the mode of operation will be discussed below. Here, particular reference is made to how a remote foreign echo is suppressed. For the description of the function it will be assumed below that the first conference terminal 74 is in a talk operation and the second conference terminal 76 in a listening operation. Further, it is assumed that the two conference participants 70, 72 are spatially so close to each other that a direct acoustic connection 110 exists between the two. This means, e.g., the second conference participant 72 can hear the first conference participant 70 without usage of a voice conference system.

If the first conference participant 70 speaks, the acoustic information is transmitted to the second conference participant 72 via the direct acoustic path 110. Further, the voice information from the first conference participant 70 to the conference terminal of the second conference participant 72 is also transmitted on a signal path 114 by the voice conference system. Thereby, the acoustic voice signal of the first conference participant 70 is received by the microphone 80 of the first conference terminal 74. Further, the voice signal of the first conference participant 70 is passed on to the conference central unit 78 via the first connection 88. There, it is incorporated into the conference composite signal. Then, the voice signal of the first conference participant 70 is then passed on to the second conference terminal 76 as part of the conference composite signal by the conference central unit 78, and in the same again supplied to a means 100 for echo suppression. Further, a microphone signal is supplied to the means 100 for echo suppression, which is based on the sound signal received by the microphone 92 of the second conference terminal 76. Thus, the microphone signal comprises the audio signal, which the second conference participant 72 receives on the direct acoustic path 110 from the first conference participant 70. Apart from possible distortions and the delay, the same is equal to the portion of the conference composite signal effected by the first conference participant 70. The means 100 for echo suppression is now implemented such that the same suppresses the portion of the conference composite signal, which is equal to the microphone signal or corresponds to the microphone signal, respectively. Thus, in the given case, no signal is applied to the output 120 of the means 100 for echo suppression. Consequently, no signal is output on the loudspeaker 86 of the second conference terminal 76. A remote foreign echo, which the second conference participant 72 would perceive, when the means 100 for echo suppression would not exist, is thus suppressed. Thus, the second conference participant 72 perceives exclusively the voice signal of the first conference participant 70 transmitted via the direct acoustic path 110.

It is explicitly noted that the described arrangement is a portion of a voice conference system. A real voice conference system comprises typically significantly more participants. However, the same are not shown here to enable a clearer description of echo suppression.

The type of connection between a conference terminal 74, 76 and the conference central unit 78 can be selected within a wide range. A wireless connection is preferred, since the same allows the installation of a conference system with very low installation effort. Additionally, in a radio-based solution, it is possible that the participants of the conference can move around freely in the room. However, it is also possible to select a wire transmission. Thereby, both a point-to-point connection between conference terminal and conference central unit as well as a bus connection can be chosen. For example, the usage of an already existing Ethernet network is possible.

Further, it is possible that either all conference terminals are directly coupled to the central unit, or that several central units are present, which are again coupled via a connection. Such a distributed structure has the advantage that extensive conferences can be switched. Particularly when using a wireless transmission between conference terminal and conference central unit, it can be desirable to use several central units to reduce the maximum distance between the conference terminal and the conference central unit, which allows the usage of a lower transmitting power. Thus, the available radio resource is used more effectively.

The spatial distance between a first conference participant and a second conference participant can also be altered. Particularly, it is possible that no direct acoustic signal path exists between the two conference participants. In such a case, the means 110 for echo suppression does not become active, and the second conference participant 72 hears a voice signal transmitted via the voice conference system instead of the voice signal of the first conference participant transmitted on the direct acoustic path. Here, however, a signal delay in the range of several 10 milliseconds results, which, however, has no further spurious effect.

Figure 3:
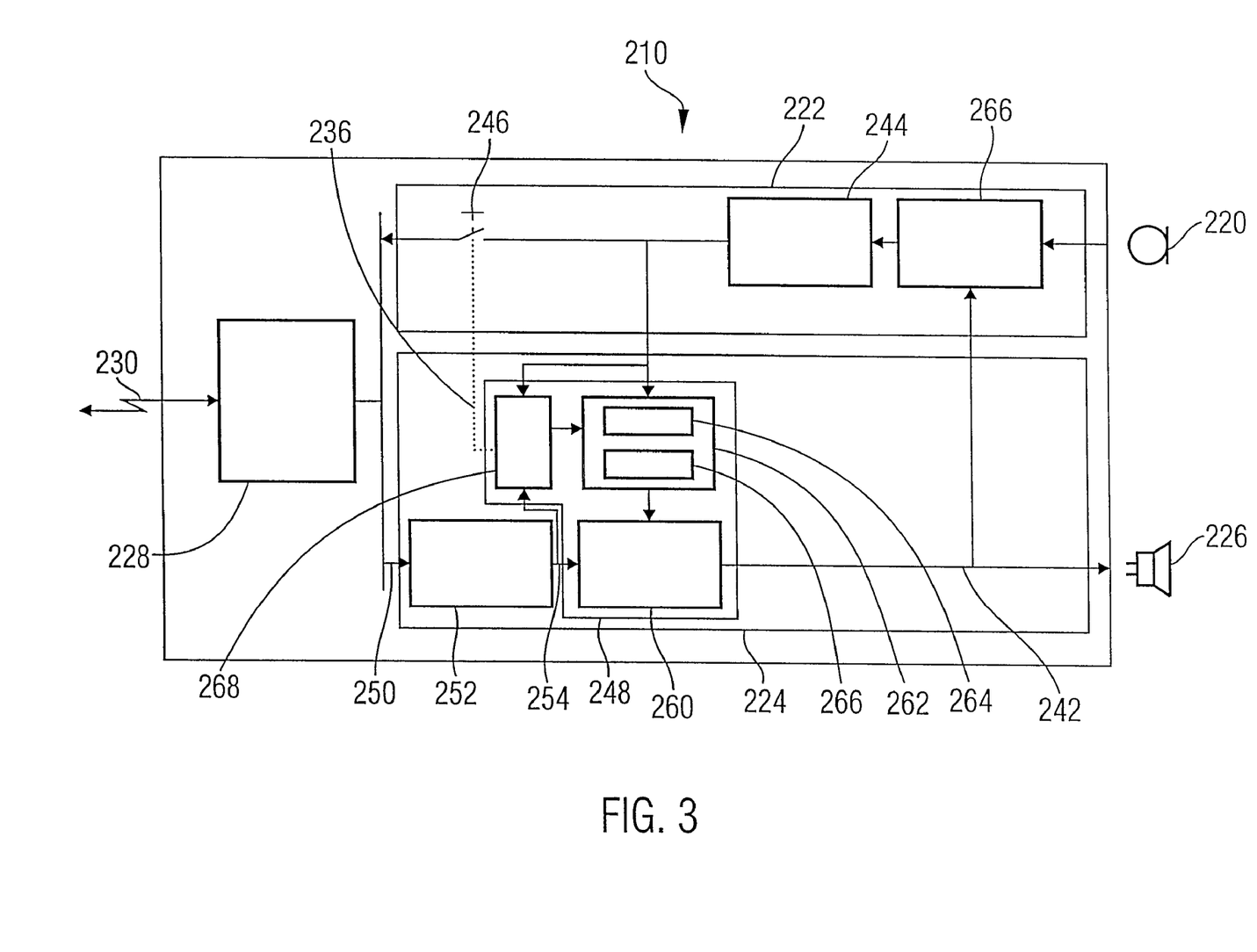
FIG. 3 is a block diagram of an inventive conference terminal according to an embodiment of the present invention.

FIG. 3 shows a block diagram of an inventive conference terminal according to an embodiment of the present invention, which is designated by 210 in its entirety. The same comprises a microphone 220, which provides an input signal for a talk branch 222. Further, the conference terminal 210 comprises a listening branch 224, which provides an output signal for a loudspeaker 226. Both the talk branch 222 and the listening branch 224 are connected to a wireless transceiver 228. The same is implemented to establish a wireless connection 230 to a conference central unit. The talk branch 222 comprises a means 240 for local echo suppression. The same receives a signal from the microphone 220 as well as the loudspeaker signal 242. In the talk branch 222, the means 240 for local echo suppression is followed by an audio encoder 244. The output signal of the audio encoder 244 is available at the output of the talking branch 222 switched by a talk key 246, and is supplied to the wireless transceiver 228. The output signal of the audio encoder 244 is further supplied to the means 248 for echo suppression of the listening branch 224. Further, the listening branch 224 receives an encoded conference composite signal 250 from the wireless transceiver 228. The encoded conference composite signal 250 is supplied to an audio decoder 252 in the listening branch 224. The same generates a decoded conference composite signal 254 therefrom. The decoded conference composite signal 254 as well as the output signal of the audio encoder 244 of the talk branch 222 is supplied to the means 248 for echo suppression. The same receives further a switching signal 256, which depends on the state of the talk key 246 and signalizes switching between a listening operation and a talk operation. The output signal of the means 248 for echo suppression is the loudspeaker signal 242, which is supplied to the means 240 for local echo suppression of the talking branch 222 as well as the loudspeaker 226. The means 248 for echo suppression comprises a means 260 for noise suppression as well as a preprocessing means 262. The preprocessing means 262 comprises an audio decoder 264 as well as a delay line with variable length 266. Further, the means 248 for echo suppression comprises a means 268 for adjusting a delay time.

In the talk operation of the conference terminal 210 (talk key 246 pressed), an audio signal supplied by the microphone 220 is first subject to local echo suppression in a means 240 for local echo suppression. Then, the same is encoded by an audio encoder 244 and finally transmitted to a conference central unit by the wireless transceiver 228. The central unit provides a conference composite signal, which is provided at the output of the wireless transceiver 228 as encoded conference composite signal 250. The same is decoded in an audio decoder 252.

Finally, a remote own echo is removed or reduced, respectively, by a means 248 for echo suppression. Thereby, a preprocessing means 262 as well as means 260 for noise suppression participate. The original encoded audio signal, which is provided by the microphone 220 of the conference terminal 210 is first decoded in the audio decoder 264 of the preprocessing means 262 and then delayed by a predefined delay period in a delay line 266, which is also included in the preprocessing means 262. The delay period is thereby determined by a means 268 for setting a delay time. The same is predetermined in a talk operation and is determined by the delay of the overall system. This is, for example, the sum of the delay of the local echo suppressor, the audio encoder, the wireless transmission path, the summation of all talk position signals in the conference central unit as well as the audio decoder. This delay period is typically known with good accuracy. The actual echo suppression is performed by removing the echo portion from the conference composite signal 254. This object is achieved by a means 260 for noise suppression. In the simplest case, this means can use a temporal difference formation. The output signal of the means 260 for noise suppression is then output on the loudspeaker 226 of the conference terminal 210.

In the listening operation of the conference terminal 210 (talk key 246 not pressed), the audio signal received by the microphone 220 is further subject to local echo suppression and audio encoding, but not passed on to the wireless transceiver 228. However, the encoded microphone signal is further available at the means 248 for echo suppression and particularly at the means 260 for noise suppression and is used for suppressing a remote foreign echo. The same is present when an audio signal of another conference participant is perceived on a direct acoustic path at the location of the conference terminal 210, and is also present in the decoded conference composite signal 254. Due to the delay time of the voice conference system, the signal of another conference participant in the decoded conference composite signal 254 has a delay in relation to the audio signal perceivable on the direct acoustic path. However, this delay is not exactly known. The propagation time of the signal via the voice conference system, as described above, can be calculated with good accuracy, but the propagation time of an audio signal on the air path from a remote speaker to the local microphone is unknown, since the same depends on the distance between two conference participants. Again, the means 260 for noise suppression is used to remove the audio signal applied to the local microphone 220 from the decoded conference composite signal 254. In order to achieve this, the audio signal received at the microphone 220 has to be delayed in a delay line 266. The delay time of the adjustable delay line 266, which is included in the preprocessing means 262, has to be determined. This can be performed by an appropriate comparison of the microphone signal with the decoded conference composite signal 254 in a means 268 for determining a delay time (adaptive delay time). On the other hand, when knowing the distance between the two participating conference participants, it is possible to calculate the delay time, whereby the means 268 for determining a delay time can be implemented in a simpler way and does not have to use the audio signals. Removing the echo signal can, for example, be performed by subtracting the delayed microphone signal from the conference composite signal 254 coming from the conference central unit.

When considering the mode of operation of the means 248 for echo suppression, two modes of operation can be differentiated. In the talk operation, the own voice signal is transmitted to the conference central unit. An own remote echo is compensated by the means 248 for echo suppression and is particularly compensated by the means 260 for noise suppression. The time constants of the adjustable delay line 266 are fixed.

In a listening operation, the microphone signal of the conference terminal is not transmitted to the conference central unit. However, it is still used for compensating a removed foreign echo by the means 248 for echo suppression and particularly by the means 260 for noise suppression. The time constants of the adjustable delay line 266 are adaptive, i.e. they are adapted to the conference composite signal 254 or the microphone signal, respectively, such that optimal suppression of an echo is possible. In this embodiment, differentiation of listening operation and talking operation is made by user operation. The user activates a talk key 246 to activate the talk operation.

The conference terminal 210 can be altered within a wide range without deviating from the central idea of the invention. Particularly, it is possible to realize automatic listening-talk switching. Thereby, for example voice activity detection (VAD) can be used. This has the advantage that manual switching from talk operation to listening operation is no longer required. This increases the user comfort of the voice conference system.

Further, manifold variations are possible when determining the variations during the determination of the delay time of the adjustable delay line. Particularly, it is possible to provide the conference terminal with a means for manual adjustment of a delay. Such a delay can be determined from the distance of neighboring conference participants. This is particularly useful when only a few neighboring conference participants have a spurious influence on a given participant. It is the advantage of such a solution that the realization effort is significantly decreased. Particularly, the requirement to extract the delay time from the waveforms, which is associated with a high computing effort, is omitted.

On the other hand, it is possible to determine such a delay time by forming a cross-correlation function between the microphone signal and the decoded conference composite signal. If the audio signal received by the microphone is included in a delayed way in the decoded conference composite signal, this is expressed in a maximum in the corresponding cross-correlation function. It is the advantage of such a procedure that a priori knowledge of the delay time is not required. Thus, the voice conference system can be universally applied and requires no preconfiguration with regard to the delay time. It is also insignificant when the distance between several conference participants is altered, e.g. because they move within the room.

The means 260 for noise suppression can be implemented in different ways. It is the general object of this means to remove a given signal portion from the composite conference signal. Particularly, the signal provided by the delay means is to be removed from the composite conference signal, since the same represents the echo to be suppressed. In a simple case, in the time domain, the means for noise suppression forms the difference between the decoded conference composite signal and the delayed microphone signal. Such an arrangement can easily be realized. Further, it is possible to eliminate the microphone signal by spectral difference formation from the decoded conference composite signal. Therefore, the delayed microphone signal and the conference composite signal are subject to a (discrete) Fourier transformation. For example, the (discrete) power density spectrum is formed. Then, the power density spectrum of the delayed microphone signal is subtracted from the power density spectrum of the conference composite signal. This is performed for several discrete frequency values or several frequency bands, respectively. The result of the subtraction is a new power density spectrum. This is then converted back to a loudspeaker signal. It is the advantage of such a procedure that in contrast to a direct subtraction of the signal in the time domain, phase relations play no part in difference formation in the frequency range using a power density spectrum. Namely, due to the usage of audio encoders and audio decoders, it cannot be ensured in the voice conference system, that no phase shifts occur during the transmission of the audio signal. Thus, spectral difference formation is suitable to subtract a signal from another signal, or to remove the same from another signal, respectively, without introduction of interference effects. The suppression of the influence of phase relations by spectral difference formation is thus very well adapted to the characteristics of a digital transmission system, which comprises signal encoders and signal decoders.

In a similar way, a Wiener filter can be used to remove a spurious signal or echo signal, respectively, from a conference composite signal. The transmission characteristic of the Wiener filter can thereby be adapted for a short segment of a signal where the same is assumed to be stationary, as soon as the power density spectrum of the spurious signal (delayed microphone signal) and the interfered useful signal (composite conference signal) are known. Overall, the application of a Wiener filter is thereby very similar to spectral difference formation. However, the application of a Wiener filter requires the separation of the audio signal into short portions, where the same is mainly stationary. For such a segment, the transmission function of the Wiener filter is calculated and the Wiener filter is then applied to the signal.

Further, it is possible to shift the means for encoding and decoding the audio signals in the signal processing chain. Particularly, it is not required to first encode the microphone signal and then decode the same again in the means for echo suppression. Rather, the unencoded microphone signal can be supplied directly to the means for echo suppression.

Apart from that, the connecting means can be implemented such that the same receives a bit stream and maps bits of this bit stream by a mapping function on a carrier. Thereby, the mapping function describes one of the digital modulation methods known from communications engineering. For example, quadrature amplitude modulation (QAM) or QPSK modulation can be used. However, any other digital modulation method can be used.

Further, the means for echo suppression can be improved by introducing adaptable amplifications in the noise suppressor. Such a measure allows to suppress echo suppression independent of its level. Particularly, it can be expected that a signal of another conference participant arrives at the microphone of the conference terminal with another level than included in the conference composite signal. Thus, for suppressing the echo signal in the conference composite signal, scaling of the delayed microphone signal to be removed therefrom is required. Scaling can either be performed by using a fixed predetermined scaling factor or in an adaptive way adapted to the signals. The latter procedure has the advantage that even weak echoes can be effectively suppressed. Such a procedure is particularly important when a foreign signal is received both directly and via the radio path with approximately the same strength.

Further, it is possible to introduce adaptable threshold values into the means for echo suppression, which determine starting from which level of the microphone signal echo suppression takes place. It is not desirable to remove the corresponding signal portion from the conference composite signal when a very weak microphone signal is present. Rather, it is assumed that a removed voice signal with only a low level directly audible at the location of the conference terminal of another conference participant is to be received via the conference system. In this case, echo suppression is not desired.

Thus, by introducing adaptable threshold values and amplifications in the noise suppressor, the voice conference system can be adapted to the thresholds, where a foreign signal is received both directly and via the radio path with approximately the same strength.

Further, it is possible to transmit further control signals via the wireless interface from one conference terminal to the conference central unit, which give information about the position and configuration of the conference terminal. Thus, it is also possible to influence the configuration of the configuration terminal from the central unit. This can possibly be helpful to ease the adaptation of the corresponding parameters of a conference terminal.

Thus, the present invention allows to realize digital wireless voice conference systems, which ensure high voice quality and interference immunity with minimum wiring effort.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A conference terminal for a digital voice conference system, comprising:
    a first sound transducer, which is implemented to generate a microphone signal from an acoustic signal;
    a second sound transducer, which is implemented to generate an acoustic signal from a loudspeaker signal;
    a connector, which is implemented to enable a connection between the conference terminal and a conference central unit for receiving a composite conference signal from the conference central unit; and
    a suppressor for echo suppression, which is implemented to combine the microphone signal or a signal derived therefrom with the composite conference signal, in a listening operation of the conference terminal, such that a loudspeaker signal results, in which the acoustic signal, on which the microphone signal is based, is reduced, or to combine the microphone signal or a signal derived therefrom with the composite conference signal, in a talk operation wherein the microphone signal is transmitted to the conference central unit, such that a loudspeaker signal results, in which the acoustic signal, on which the microphone signal is based, is reduced; and
    a threshold decider, which is implemented to deactivate the suppressor for echo suppression when the microphone signal is smaller than a predetermined threshold.

2. The conference terminal according to claim 1, wherein the connector is implemented such that it allows a wireless connection between the conference terminal and the conference central unit.

3. The conference terminal according to claim 1, wherein the connector is implemented such that it receives a bit stream and maps bits of this bit stream by a mapping function onto a carrier.

4. The conference terminal according to claim 1, further comprising an encoder, which is implemented to encode the microphone signal, by converting the same from a sequence of time samples into a sequence of bits.

5. The conference terminal according to claim 3, further comprising a decoder, which is implemented to decode or generate a wireless transmitted digital conference composite signal.

6. The conference terminal according to claim 1, wherein the suppressor for echo suppression comprises a delay element, which is implemented to delay the microphone signal or a signal derived therefrom by a delay time.

7. The conference terminal according to claim 6, wherein the delay element is implemented such that the delay time can be adjusted.

8. The conference terminal according to claim 7, wherein the suppressor for echo suppression comprises an adjuster for adjusting the delay time in dependence on the microphone signal and the conference composite signal.

9. The conference terminal according to claim 8, wherein the adjuster for adjusting the delay time comprises a correlator, which is implemented to form a cross-correlation function between the microphone signal and the conference composite signal.

10. The conference terminal according to claim 7, wherein the suppressor for echo suppression comprises an adjuster for manual adjustment of the delay time.

11. The conference terminal according to claim 6, wherein the delay element is implemented such that the delay time is adjusted to a fixed value in a talk operation and, in a listening operation, is adjusted adaptively in dependence on a time shift between the microphone signal and a portion contained in the conference composite signal, which is mainly equal to the microphone signal.

12. The conference terminal according to claim 6, wherein the suppressor for echo suppression comprises a suppressor for noise suppression, which is implemented to reduce a signal portion, which is substantially equal to the delayed microphone signal, in the composite conference signal.

13. The conference terminal according to claim 12, wherein the suppressor for noise suppression comprises a former for difference formation between the microphone signal or a signal derived from the microphone signal and the conference composite signal in the time domain.

14. The conference terminal according to claim 12, wherein the suppressor for noise suppression comprises a former for difference formation between the microphone signal or a signal derived from the microphone signal and the conference composite signal in the spectral domain.

15. The conference terminal according to claim 12, wherein the suppressor for noise suppression comprises a Wiener filter.

16. The conference terminal according to claim 1, wherein the suppressor for echo suppression comprises a scaler, which is implemented to scale the microphone signal, a signal derived from the microphone signal, the conference composite signal or the loudspeaker signal.

17. The conference terminal according to claim 1, further comprising a switch, which is implemented to enable switching between the listening operation and the talk operation independent of a listening/talk control signal.

18. The conference terminal according to claim 6, wherein the suppressor for echo suppression is implemented to adjust an adaptive time delay in dependence on the time shift between the microphone signal and a portion contained in the conference composite signal, which is substantially equal to the microphone signal, controlled by the listening/talk control signal in the listening operation, and to set a fixed delay time in the talk operation.

* * * * *